Oct. 21, 1969   R. D. HULL   3,473,753
CLOSED FACE SPINNING REEL HOUSING
Original Filed June 15, 1966   2 Sheets-Sheet 1
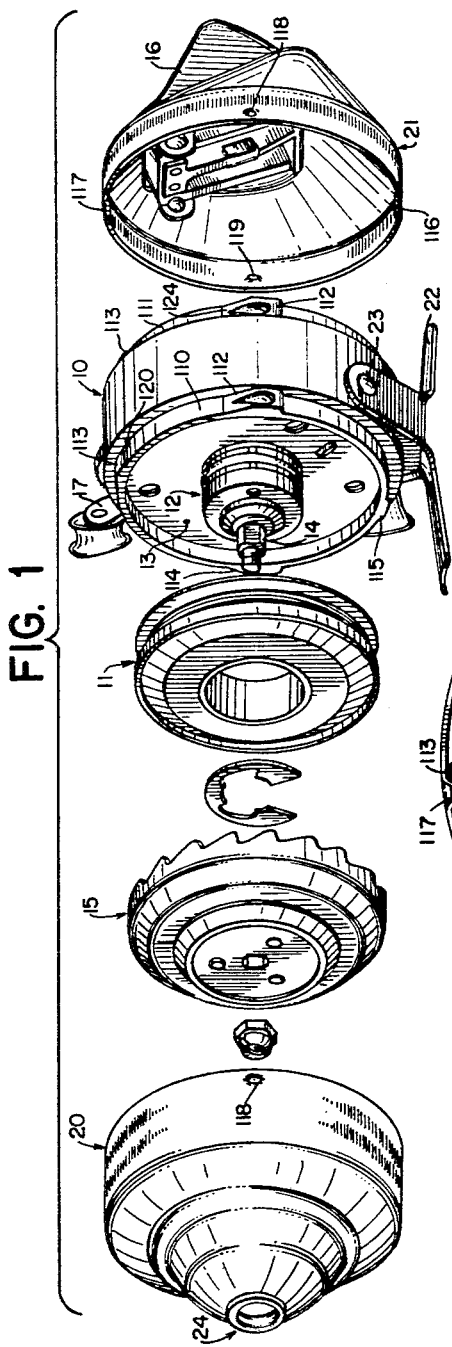
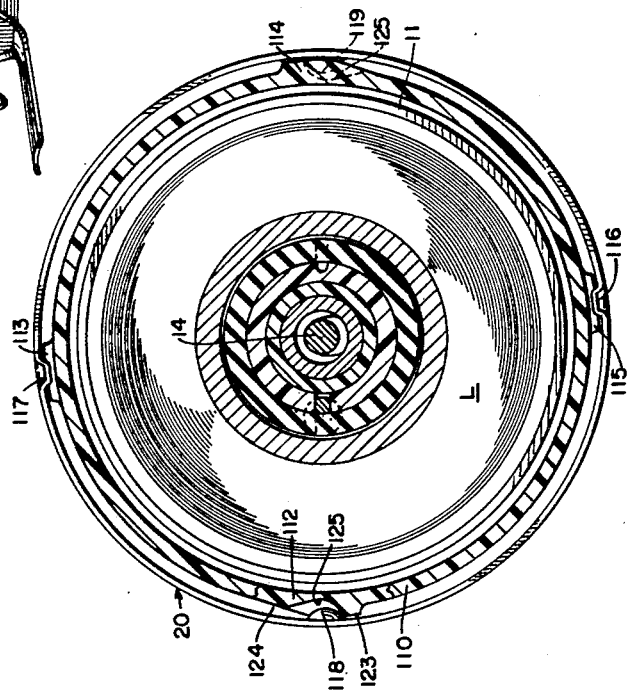
INVENTOR
R. DELL HULL
BY Mandeville & Schweitzer
ATTORNEYS

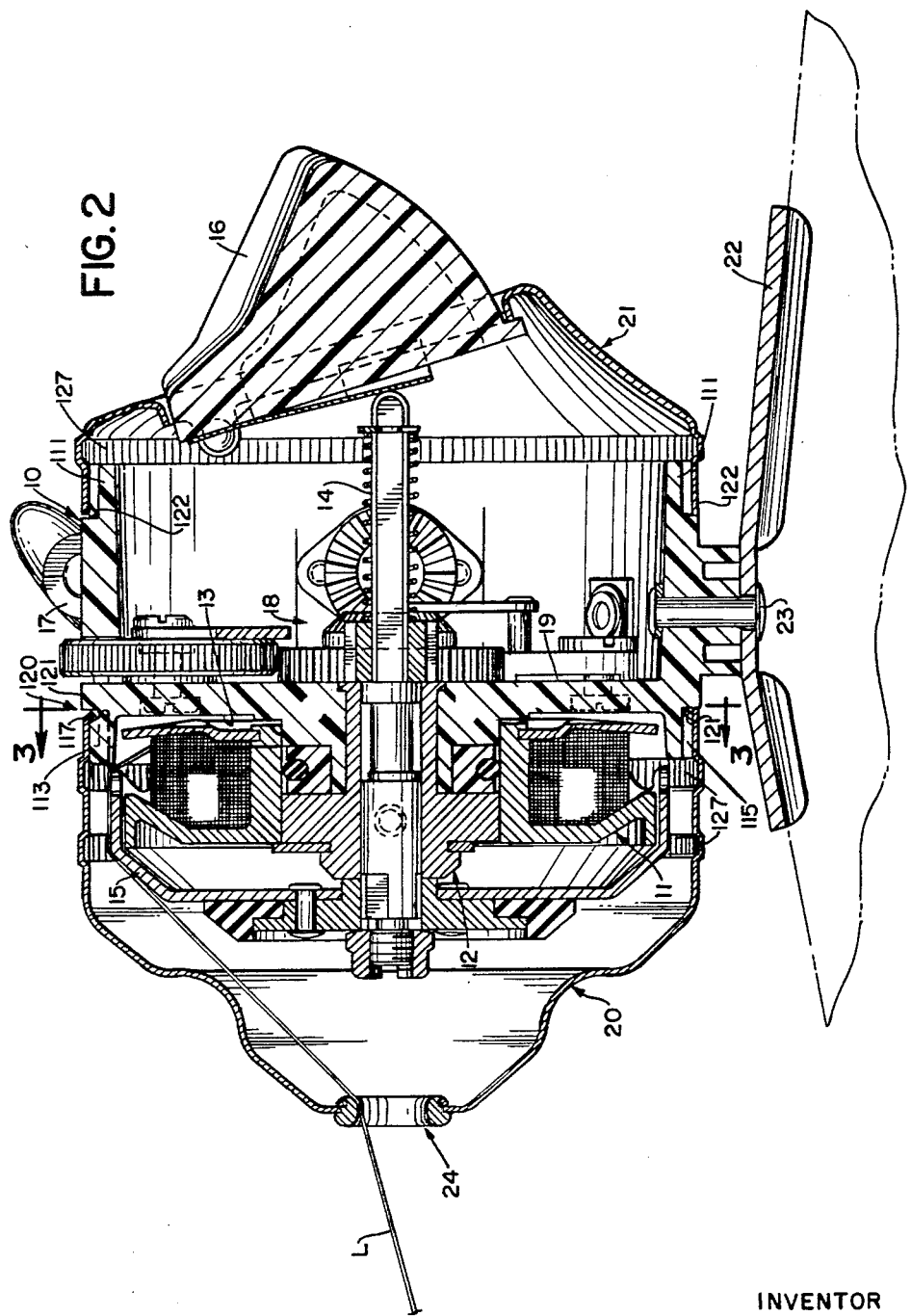

United States Patent Office 3,473,753
Patented Oct. 21, 1969

3,473,753
CLOSED FACE SPINNING REEL HOUSING
R. Dell Hull, 6101 E. Apache St., Tulsa Okla. 94115
Original application June 15, 1966, Ser. No. 557,752.
Divided and this application Dec. 1, 1967, Ser. No. 687,192
Int. Cl. F16d *1/06;* A01k *89/04*
U.S. Cl. 242—84.2   3 Claims

ABSTRACT OF THE DISCLOSURE

The invention is directed to generally cup-shaped closed face covers for a spinning reel, which covers are attached to annular flanges of a reel frame by simple push-and-turn actions. Spaced cover supporting and locking elements are formed on said flanges and cooperate with appropriate detent buttons and stabilizing keys formed at the peripheries of said covers to secure the covers to the reel frame.

RELATED APPLICATION

This application is a division of my copending application Ser. No. 557,752, filed June 15, 1966.

BACKGROUND OF INVENTION

In a "closed face" type spinning reel, a line spool is normally non-rotatably mounted on a hub which projects forwardly from a reel frame and is closed by a housing including at least one removable cup-shaped cover. While the line spool is normally non-rotatable, provision is made for limited rotary slippage or "drag" of the spool relative to the reel frame for controlled withdrawal of line from the spool. The line itself is conducted to and from the spool through a centrally disposed line guide in the front cover.

Retrieval of paid out fishing line may be effected in reels of this type by a spinner head mounted on a rotatable main shaft. Advantageously, the spinner head may include a plurality of rearwardly opening pickup slots formed thereon and may be selectively axially displaced and held in a forward, non-line engaging position during casting and in a rearward, line engaging position during line retrieval. A crank assembly is included in the reel to effect the necessary rotation of the main shaft and to retrieve paid out line. Furthermore, reels of this type generally include a selectively actuatable anti-reverse mechanism to prohibit rotation of the retrieval mechanism in a "reverse" line pay out direction.

SUMMARY OF INVENTION

As an important aspect of the invention, a new and improved cover assembly is provided for independently and securely locking front and rear covers to a spinning reel frame with a simple "apply and twist" manipulation. To that end and in accordance with the principles of the invention, forwardly and rearwardly extending cylindrical flange portions of the reel frame are provided with a diametrically opposed pair of ratchetlike portions having locking recesses formed therein and a pair of diametrically opposed locking grooves located intermediately of the locking recesses. Each of the covers has radially inwardly projecting detents and radially inwardly projecting keys formed thereon and spaced to cooperate with the locking recesses and locking grooves. The covers may be attached to the reel frame by telescoping the detents and keys with the flange portions of the reel frame and thereafter rotating the detents and keys into locking engagement with the recesses and grooves. The assembly of covers to reel frame is made very easy, yet the attachment is both stable and reliable.

DESCRIPTION OF DRAWINGS

For a more complete understanding of the invention and its attendant advantages, reference should be made to the following detailed description taken in conjunction with the accompanying drawings, in which:

FIG. 1 is an exploded perspective view of a new and improved fishing reel embodying the inventive concepts;

FIG. 2 is a cross-sectional view of the new fishing reel;

FIG. 3 is a cross-sectional view of the reel taken along line 3—3 of FIG. 2.

Referring to FIGS. 1 and 2, the new and improved fishing reel includes a generally cylindrical reel frame body 10 which mounts a line spool 11 on a hub 12 projecting from its front wall 13. A main shaft 14 is supported in the reel frame body for rotation and limited axial displacement. As shown best in FIG. 1, a notched spinner head 15 is mounted at the forward end of the main shaft, while a thumb button 16 engages its rearward end. The reel also includes a crank 17 which drives the main shaft 14 through a gear train 18 disposed at the rear wall 19 of the reel frame body. The reel frame body and the elements supported thereby are generally enclosed by front and rear covers 20 and 21, respectively. As shown, a rod mount 22 is affixed to the reel frame body through rivets 23.

The above described elements are, in general, common to many spinning reels of this general type. However, it should be understood that the present invention is directed to specific improvements in the housing assemblies of such reels.

As shown best in FIG. 1, the reel frame 10 includes forwardly and rearwardly projecting cylindrical flanges 110, 111, respectively, which are of a diameter slightly less than the diameter of the cylindrical flange portions of the front and rear covers 20, 21, to provide for a substantial clearance between the covers and flange portions. In accordance with one aspect of the invention, four cover supporting and locking projections 112–115 are formed at approximate 90° intervals on each of the flanges 110, 111, which projections are adapted to cooperate with radially inwardly extending appurtenances formed at corresponding 90° intervals on the covers 20, 21. More specifically, these appurtenances are in the nature of stabilizing keys 116, 117 formed at the peripheral edges of each of the covers and detent buttons 118, 119 formed adjacent the edges, as shown in FIGS. 1 and 3. More specifically, the projections 113, 115 are axially spaced from the front and rear shoulders 121, 122 formed between the cylindrical flanges 110, 111 and the reel frame body 10 to define keyways or grooves 120 therebetween (FIG. 2). The projections 112, 114, as shown in FIGS. 1 and 3, advantageously have ratchetlike profiles which are defined by inclined planes 124 which rise gradually from the flanges to outermost cover supporting portions 123 (FIG. 3) having a diameter slightly less than that of the cover members. The cover supporting portions 123 drop away abruptly to the flanges 110, 111. Within each of the projections 112, 114 a tear-drop shaped recess 125 is formed.

In accordance with the invention, the covers may be assembled to the reel frame by telescoping the detent buttons with the flanges 110, 111 aligned adjacent to the sloped portions of the projections 112, 114 and thereafter rotating the covers to snap the buttons into locking engagement with the recesses 125 and to engage the keylike elements 116, 117 in the keyways 120. The covers may be lockingly engaged with the projections 112, 114 from the sloped portions only, since the detent buttons are effectively prevented from entering the recesses over the abrupt drop off portions of the ratchetlike projections 112, 114. The detents 118, 119 fit closely into the recesses and require some torque to be applied for positive locking to be achieved.

The new cover lock arrangement simplifies assembly of the covers to the reel frame by an easy push-and-turn action, because the initial rotary alignment of the cover to frame is not critical. At the same time, a highly stable cover lock arrangement is afforded by a four-point locking support of the cover, only two of the four points being detent locks, however, to facilitate easy manual locking and unlocking by turning of the cover. By providing a clearance space between the covers 20, 21 and the flanges 110, 111 sufficient to accommodate the inward projection of the stabilizing keys and detent buttons, the covers may be applied axially to the reel frame in any rotary orientation over a range of about 80 degrees.

It should be understood that the specific structure herein illustrated and described is intended to be representative only, as certain changes may be made therein without departing from the clear teachings of the disclosure. Accordingly, reference should be made to the following appended claims in determining the full scope of the invention.

I claim:

1. A cover assembly for a closed face spinning reel comprising
   (a) a generally cylindrical reel frame body having at least one axially extending flange projecting from a shoulder portion on said body;
   (b) a cover having cylindrical wall portions associable with said flange;
   (c) said flange including a first diametrically opposed pair of radial, cover supporting projections thereon which projections include recesses therein;
   (d) detent means projecting radially inwardly from peripheral portions of said cover;
   (e) said cover being loosely telescopically associable with said flange when said detent means and said projections are non-axially aligned;
   (f) said detent means being lockingly engageable with said projections only through rotation of said cover from the non-axially aligned, loosely telescoped position.

2. A cover assembly in accordance with claim 1, in which
   (a) said flange has a second pair of radial, cover supporting projections thereon;
   (b) said second pair of cover supporting projections are spaced from said shoulder portion and cooperate therewith to define keyways;
   (c) said cover includes keylike means formed intermediately of said detent means;
   (d) said keylike means are adapted to enter said keyways simultaneously with the locking engagement of said detent means with said recesses.

3. A cover assembly in accordance with claim 1, in which
   (a) said first projections have a ratchetlike profile and accommodate engagement of said detent means with said recesses in only one predetermined direction.

References Cited

UNITED STATES PATENTS

| | | | |
|---|---|---|---|
| 2,783,952 | 3/1957 | Clay | 242—84.21 |
| 3,296,731 | 1/1967 | Wood | 242—84.21 XR |

BILLY S. TAYLOR, Primary Examiner

U.S. Cl. X.R.

287—53